US012595395B2

(12) United States Patent (10) Patent No.: US 12,595,395 B2
Lincker et al. (45) Date of Patent: Apr. 7, 2026

(54) KIT-OF-PARTS FOR CURABLE POLYASPARTIC ACID ESTER-BASED COATING COMPOSITIONS

(71) Applicant: BASF COATINGS GMBH, Münster (DE)

(72) Inventors: Michel Lincker, Clermont de l'Oise (FR); Jerome Carlier, Clermont de l'Oise (FR); Yannick Pichot, Clermont de l'Oise (FR)

(73) Assignee: BASF COATINGS GMBH, Muenster (DE)

( * ) Notice: Subject to any disclaimer, the term of this patent is extended or adjusted under 35 U.S.C. 154(b) by 778 days.

(21) Appl. No.: 17/905,522

(22) PCT Filed: Feb. 23, 2021

(86) PCT No.: PCT/EP2021/054435
§ 371 (c)(1),
(2) Date: Sep. 2, 2022

(87) PCT Pub. No.: WO2021/175661
PCT Pub. Date: Sep. 10, 2021

(65) Prior Publication Data
US 2023/0121036 A1 Apr. 20, 2023

(30) Foreign Application Priority Data
Mar. 4, 2020 (EP) ..................................... 20290027

(51) Int. Cl.
*C09D 175/06* (2006.01)
(52) U.S. Cl.
CPC .................................. *C09D 175/06* (2013.01)
(58) Field of Classification Search
CPC .................................................. C09D 175/06
See application file for complete search history.

(56) References Cited

U.S. PATENT DOCUMENTS

| | | | |
|---|---|---|---|
| 5,126,170 A | 6/1992 | Zwiener et al. | |
| 5,236,741 A | 8/1993 | Zwiener et al. | |
| 5,821,326 A | 10/1998 | Kurek et al. | |
| 6,169,141 B1 | 1/2001 | Kurek et al. | |
| 6,911,501 B1 | 6/2005 | Danielmeier et al. | |
| 7,276,572 B2 | 10/2007 | Roesler et al. | |
| 2013/0109793 A1 | 5/2013 | Schaefer et al. | |
| 2013/0203934 A1 | 8/2013 | Best et al. | |
| 2016/0032142 A1 | 2/2016 | Huybrechts et al. | |
| 2019/0211241 A1 | 7/2019 | Fukuda et al. | |
| 2020/0031982 A1 | 1/2020 | Wen et al. | |
| 2021/0071030 A1* | 3/2021 | Mano ................ C08G 18/6229 | |

FOREIGN PATENT DOCUMENTS

| | | | |
|---|---|---|---|
| CN | 107106472 | * 12/2015 | ............... A61K 8/60 |
| EP | 0403921 A2 | 12/1990 | |
| EP | 0470461 A2 | 2/1992 | |
| EP | 0939091 A1 | 9/1999 | |
| EP | 2829562 A1 | 1/2015 | |
| EP | 3594300 A1 | 1/2020 | |
| JP | 201923291 A | 2/2019 | |
| WO | 2004063242 A1 | 7/2004 | |
| WO | 2011126562 A2 | 10/2011 | |
| WO | 2015013050 A1 | 1/2015 | |

OTHER PUBLICATIONS

International Search Report and Written Opinion for PCT/EP2021/054435 issued on May 20, 2021, 9 pages.
European Search Report for EP Patent Application No. 20290027.0, Issued on Aug. 28, 2020, 3 pages.

* cited by examiner

*Primary Examiner* — Shane Fang
(74) *Attorney, Agent, or Firm* — Armstrong Teasdale LLP

(57) ABSTRACT

Disclosed herein is a kit-of-parts for preparation of a curable coating composition including in a first container an isocyanate-reactive compound (A) including a polyaspartic acid ester compound, in a second container a polyisocyanate (B), and in a third container a solvent (S1) selected from the group consisting of monoalcohols and alkoxymonoalcohols, where UVA and/or HALS additives are optionally contained in the first and/or third container, and a second solvent (S2) is optionally contained in the second or third container. Further disclosed herein are a coating composition prepared from the kit-of-parts, a process for preparing at least one coating on an optionally pretreated and optionally precoated substrate, and coated substrates derived therefrom.

20 Claims, No Drawings

1

KIT-OF-PARTS FOR CURABLE POLYASPARTIC ACID ESTER-BASED COATING COMPOSITIONS

CROSS-REFERENCE TO RELATED APPLICATIONS

This application is a U.S. National Phase Application of International Patent Application No. PCT/EP2021/054435, filed Feb. 23, 2021, which claims priority to European Patent Application No. 20290027.0, filed Mar. 4, 2020, each of which is hereby incorporated by reference herein.

FIELD OF THE INVENTION

The present invention relates to a kit-of-parts for preparation of a curable coating composition, preferably a curable clearcoat coating composition, comprising in a first container an isocyanate-reactive compound (A) comprising a polyaspartic acid ester compound, in a second container a polyisocyanate (B), and in a third container a solvent (S1) selected from monoalcohols and alkoxymonoalcohols, wherein UVA and/or HALS additives are optionally contained in the first and/or third container, and a second solvent (S2) is optionally contained in the second and/or third container. Furthermore, the invention relates to a coating composition prepared from the kit-of-parts and to a process for preparing at least one coating on an optionally pretreated and optionally precoated substrate as well as coated substrates derived therefrom.

PRIOR ART

Coating compositions based on isocyanate chemistry are well-known in the art and are used in a great variety of applications in coatings industry such as for primers, basecoats and clearcoats in painting of high-quality goods, such as automobile original coatings (OEM) and vehicle repair coatings. Isocyanate-based coating compositions may include, for example, polyurethane or polyurea coatings formed from resins comprising components, such as, for example, diisocyanates, polyisocyanates, and/or isocyanate reaction products. These resins may cure by various mechanisms so that covalent bonds form between the resin components, thereby producing a cross-linked polymer network. Great efforts have been made to develop coating compositions imparting the desired properties to the substrate or article to be coated. For example, coatings have been developed for e.g. protecting against abrasion, chemicals, corrosion, heat or mechanical impact.

Polyurea coatings based on polyaspartic acid esters have been used commercially in the automotive industry, especially in the area of vehicle refinish applications, with much success, benefiting from the general lower viscosity of the aspartic acid ester compound compared to a polyol, which is the main agent of a polyurethane coating composition, and in addition a high reactivity of an amino group of an aspartic acid ester compound with an isocyanate group of an aliphatic and/or alicyclic polyisocyanate. Hence, polyaspartic coating composition have characteristics in which the curing speed thereof is rapider than that of a polyurethane coating composition even at room temperature and the mechanical strength thereof is excellent.

Aspartate-based coating compositions are well known in the art. For example, EP0403921 describes coating compositions with binders based on a polyisocyanate component and an isocyanate reactive component containing specific secondary polyamines. These secondary polyamines are also called polyaspartic acid derivatives and are based on primary polyamines and diesters of maleic or fumaric acid. EP0470461 also describes two-component coating compositions for vehicle refinish applications containing a polyisocyanate component and an isocyanate-reactive secondary diamine prepared from 3,3'-dimethyl 4,4'-diamino dicyclohexylmethane and maleic diethylester. The isocyanate-reactive component further contains a hydroxyl-functional component consisting of polyhydroxypolyacrylates or mixtures of polyhydroxypolyacrylates and polyesterpolyols. EP0939091 A1 further discloses the addition of diluent solvents to slow down the reaction or interaction of such coating composition comprising amine functional compound usually decreasing pot life during storage, without slowing down the reaction after the coating film is applied. WO2011/126562 A1 further discloses a polyurea coating composition comprising the reaction product of a polyaspartic acid ester component with a mixture of an aliphatic and a cycloaliphatic isocyanate functional material to improve the cure rate and adhesion to metal substrates. High solids or solventless aliphatic polyaspartic coating compositions formed by an aspartic acid ester compound and an aliphatic and/or alicyclic polyisocyanate composition in which the contents (% by mole) of an isocyanurate group, iminooxadiazinedione group, uretdione group, allophanate group, biuret group, and/or a uretone imino group satisfy a particular relationship, have been disclosed in EP3594300.

A general disadvantage of the above aspartate-based two-component coating compositions is however that the component containing the curable polyaspartic acid ester compound remarkably discolors on storage by yellowing. Accordingly, also the coating composition comprising the curable aspartate tends to discolor or yellow during storage such that e.g. the final color of the obtained coating does not match the desired or targeted color anymore.

WO 2004/063242 discloses coating compositions containing aspartic compounds and polyisocyanate curing agents. The coating compositions contain a di-substituted phenol antioxidant or a hydroperoxide decomposer. Presence of the antioxidant or decomposer leads to coatings with good resistance to UV light. Addition of antioxidants to 2K coating compositions containing aspartate-based components to suppress discoloration/yellowing during storage at room temperature or elevated temperatures of, for example, 50° C. is also disclosed in EP2829562 A1.

WO2015/13050 A1 discloses furthermore discoloration or yellowing during storage of such aspartate-based 2K coating compositions induced by UV absorbers, with chain-extended aspartates as proposed solution.

However, it has not hitherto been possible to provide a technically simple and satisfactory solution to avoid this color instability or yellowing of polyurea coatings based on polyaspartic acid esters on storage, especially on storage at elevated temperatures of up to 50° C., or in combination with UV absorbers commonly comprised in coating formulations together with other light stabilizers, such as a hindered amine light stabilizer. Furthermore, the anti-scratch resistance of said non-yellowing polyurea coatings was to be improved without having a negative influence on the pot life.
Object Accordingly, an object of the present invention is to provide a low-temperature curing polyurea coating based on polyaspartic acid esters, especially a polyaspartic acid ester-based multicomponent coating composition that can be used as clearcoat in automotive OEM finishing and automotive refinishing, which does not suffer from discoloration or yellowing on storage at room temperature (i.e. 23° C.) as well as elevated temperatures, e.g. of up to 50° C., especially in the presence of UV absorbers and/or HALS additives commonly used, which is technically easy implemented, without having a negative impact on the excellent performance of polyurea coatings based on polyaspartic acid esters in terms of a rapid curing speed even at low temperatures with an excellent mechanical strength and pot life.

Technical Solution

The objects described above are achieved by the subject matter claimed in the claims and by the preferred embodiments of that subject matter that are described hereinafter.

A first subject of the present invention is therefore a kit-of-parts for preparation of a curable coating composition, comprising three separate containers C1, C2, and C3, wherein a) the container C1 contains an isocyanate-reactive component (A) comprising a polyaspartic acid ester compound;

b) the container C2 contains a polyisocyanate (B);

c) the container C3 contains a solvent (S1); and wherein container C2 and/or container C3, preferably container C3, optionally contain a solvent (S2); and wherein container C1 and/or container C3, preferably container C3, optionally contain an additive (AD);

characterized in that solvent (S1) is selected from mono-alcohols and alkoxymonoalcohols, preferably alkoxymonoalcohols; and solvent (S2) is a ketone; and additive (AD) is selected from UV absorbers and hindered amine light stabilizers.

The above-specified kit-of-parts is hereinafter also referred to as "kit-of-parts of the invention" or "inventive kit-of-parts" and accordingly is a subject of the present invention.

A further subject of the present invention is a coating composition, preferably a clearcoat coating composition, prepared by mixing at least containers C1, C2, and C3 of the inventive kit-of-parts.

The above-specified coating composition is hereinafter also referred to as "coating composition of the invention" or "inventive coating composition".

Another subject of the present invention is to provide a process for preparing at least one coating layer on a substrate, said process comprising the following steps:

(1) optionally applying at least one basecoat composition to at least a portion of the substrate to form at least one basecoat layer;

(2) applying a coating composition prepared from the inventive kit-of-parts or an inventive coating composition to at least a portion of the substrate or directly to the at least one basecoat layer formed in step (1), to form a clearcoat layer;

(3) curing the clearcoat layer formed in step (2), or jointly curing the at least one basecoat layer formed in step (1), if present, with the clearcoat layer formed in step (2).

The above-specified process is hereinafter also referred to as "process of the invention" or "inventive process".

A further subject of the present invention is a coating or multilayer effect and/or color coating prepared according to the inventive process and use of a coating composition prepared from the inventive kit-of-parts or of the inventive coating composition, or of the inventive process for preparing a coating layer, as coating, preferably as clearcoat, in automotive finishing, for the repair of finishes, for automotive refinishing and/or for the coating of parts for installation in or on automobiles, of plastic substrates, or of commercial vehicles, and/or for coating any type of item.

Preferred embodiments of the invention are apparent from the description hereinafter and from the dependent claims.

In light of the prior art it was surprising and unforeseeable for the person skilled in the art that the object on which the invention is based could be achieved by the technically easy solution of separating the component comprising polyaspartic acid ester compound not only from the polyisocyanate (B), as commonly performed in two-component coating compositions, but in addition also from specific solvents (S1) and optional solvents (S2) identified in the course of this invention as being a main further reason for discoloration or yellowing of the polyaspartic acid ester-comprising component upon storage. Furthermore, another source of yellowing of the polyaspartic acid ester-comprising component upon storage, especially at elevated temperatures of up to 50° C., although less pronounced compared to yellowing observed upon addition of solvents (S1) and solvents (S2), was identified as originating from the combination with UVA and HALS additives, typically added in coating compositions for OEM and/or refinish applications.

DETAILED DESCRIPTION

If reference is made in the context of the present invention to an official standard, this denotes the version of the standard that was current on the filing date, or, if no current version exists at that date, the last current version, unless stated otherwise.

In the present disclosure, including the claims, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein.

The grammatical articles "one," "a," "an," and "the," as used herein, are intended to include "at least one" or "one or more," unless otherwise indicated. Thus, the articles are used herein to refer to one or more than one (i.e., to at least one) of the grammatical objects of the article. The term "at least one" in the meaning of the present invention means that the respective compound comprises, preferably consists of, one or more kinds of the compound. By way of example, "a solvent (S1)" means one or more solvents (S1), and thus, possibly, more than one solvent (S1) is contemplated and may be employed or used.

The adjective "optional" in the meaning of the present invention means that the respective compound or component may be present or not. By way of example, if "container C2 and/or container C3 optionally contain a solvent (S2)", said containers C2 and/or container C3 may comprise a solvent (S2) if such a solvent (S2) is present, or, in the absence of a solvent (S2), would not comprise such a solvent (S2).

In this description of the invention, for convenience, "polymer" and "resin" are used interchangeably to encompass resins, oligomers, and polymers.

Inventive Kit-of-Parts

The kit-of-parts according the invention is a multicomponent system comprising at least three separate components or containers C1, C2, and C3, wherein at least the polyaspartic acid ester compound carrying amino groups being reactive with the preferably free or unblocked isocyanate functional groups of the polyisocyanate even at room temperature and without additional curing catalyst must be stored separately from each other prior to application to avoid an undesired premature reaction. Surprisingly, within this invention specific solvents (S1) and solvents (S2) have been identified to interact with the polyaspartic acid ester compound resulting in undesired discoloration or yellowing of the component comprising the polyaspartic acid ester compound upon storage. Hence, solvents (S1) and optional solvents (S2) may not be stored within the same compound or container as the polyaspartic acid ester compound as well. Another undesired reaction between the isocyanate-reactive groups of solvent (S1), i.e. hydroxyl groups, and the isocyanate functional groups of the polyisocyanate (B), leads to the technically simple solution of providing a third container or component comprising at least solvent (S1). As optional solvent (S2) does not prematurely interact with the polyisocyanate, solvent (S2) may also be stored if present together with polyisocyanate (B) in the same container or component, although storing together with solvent (S1) in the third component is preferred. In addition, the typically in OEM or refinish coating compositions comprised additive package of UVA and/or HALS additives was identified as further source of discoloration or yellowing of the polyaspartic acid ester-comprising compound upon storage, especially on storage at elevated temperatures of up to 50° C., although less pronounced compared to the tendency of strong yellowing demonstrated here for solvents (S1) and solvent (S2), for which reason the UVA and/or HALS additive are if present preferably comprised in the third component together with solvent (S1).

Container C1

Container C1 contains an isocyanate-reactive component (A) comprising at least one polyaspartic acid ester compound. The isocyanate-reactive component (A) may therefore represent a crosslinkable resin, oligomer or polymer of a coating composition which is responsible for film formation. These resins include functional groups reactive with the isocyanate functional groups of the polyisocyanate (B) forming by various mechanisms a cross-linked polymer network.

Polyaspartic acid ester compounds may also be referred to as polyaspartates or polyaspartics. Said compounds may be prepared in accordance with U.S. Pat. Nos. 5,821,326; 5,236,741; 6,169,141; 6,911,501; and 7,276,572, the entire disclosure of each of which are hereby incorporated by reference.

Suitable polyaspartic acid esters for use in accordance with the present invention include those corresponding to formula (I):

$$X-[NH-C(COOR^1)R^3-C(COOR^2)R^4H]_n \qquad (I)$$

wherein X represents an n-valent organic group inert towards isocyanate groups at a temperature of 100° C. or less, preferably the group obtained, more preferably the hydrocarbon group obtained, by removing the amino groups from an aliphatic, araliphatic or cycloaliphatic polyamine, more preferably a diamine, and $R^1$ and $R^2$ are identical or different and represent organic groups which are inert towards isocyanate groups at a temperature of 100° C. or less, preferably an alkyl group containing 1 to 9 carbon atoms and more preferably methyl, ethyl or butyl groups, or $R^1$ and $R^2$ together with the 6-carbon atom form a cycloaliphatic or heterocyclic ring, $R^3$ and $R^4$ are identical or different and represent hydrogen or organic groups which are inert towards isocyanate groups at a temperature of 100° C. or less and n represents an integer with a value of 2 or more, preferably 2 to 6, more preferably 2 to 4, and most preferably 2.

These polyaspartic acid esters may be prepared by reacting optionally substituted maleic or fumaric acid esters with polyamines as described in WO 2011/126562 A1. Therein described are suitable optionally substituted maleic or fumaric acid esters corresponding to formula (II)

$$R^1OOC-CR^3=CR^4-COOR^2 \qquad (II)$$

wherein $R^1$, $R^2$, $R^3$ and $R^4$ are as defined above.

Examples of optionally substituted maleic or fumaric acid esters suitable for use in the preparation of the polyaspartic acid esters include dimethyl, diethyl and dibutyl (e.g.; di-n-butyl) esters of maleic acid and fumaric acid and the corresponding maleic or fumaric acid esters substituted by methyl in the 2- and/or 3-position.

Suitable polyamines for preparing the polyaspartic acid esters include those corresponding to formula (III)

$$X-(-NH2)_n \qquad (III)$$

wherein X and n are as previously defined.

The polyamines include high molecular weight amines having molecular weights of 400 to about 10,000, preferably 400 to about 6,000, and low molecular weight amines having molecular weights below 400. The molecular weights are number average molecular weights (Mn) and are determined by end group analysis (NH number). Examples of these polyamines are those wherein the amino groups are attached to aliphatic, cycloaliphatic, araliphatic and/or aromatic carbon atoms.

Suitable low molecular polyamines include ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4- and/or 2,4,4-trimethyl-1,6-hexane diamine, 1,7-heptane diamine, 1,8-octane diamine, 1,9-nonane diamine, triaminononane, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diaminodicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-men-thane diamine, hydrazine, hydrazides of semicarbazido car-boxylic acids, bis-hydrazides, bis-semicarbazides, phe-nylene diamine, 2,4- and 2,6-toluylene diamine, 2,3- and 3,4-toluylene diamine, 2,4'- and/or 4,4'-diaminodiphenyl methane, higher functional polyphenylene polymethylene polyamines obtained by the aniline/formaldehyde conden-sation reaction, N, N, N-tris-(2-amino-ethyl)amine, guani-dine, melamine, N-(2-aminoethyl)-1,3-propane diamine, 3,3'diamino-benzidine, polyoxypropylene amines, polyoxy-ethylene amines, 2,4-bis-(4'-aminobenzyl)-aniline and mix-tures thereof.

Preferred polyamines are 1-amino-3-aminomethyl-3,5,5-trimethylcyclohexane (isophorone diamine or IPDA), bis-(4-aminocyclo-hexyl)methane, bis-(4-amino-3-methylcy-clohexyl)-methane, 1,6-diamino-hexane, 2-methyl pentamethylene diamine, ethylene diamine, triamino-nonane, 2,4- and/or 2,6-toluylene diamine and 4,4'- and/or 2,4'-diamino-diphenyl methane.

Suitable high molecular weight polyamines include those prepared from the known polyhydroxyl compounds of poly-urethane, especially the polyethers. The polyamines may be prepared by reacting the polyhydroxyl compounds with an excess of the further below described polyisocyanate (B) to form NCO prepolymers and subsequently hydrolyzing the terminal isocyanate group to an amino group. Preferably, the polyamines are prepared by converting the terminal hydroxy groups of the polyhydroxyl compounds to amino groups, e.g., by amination. Preferred high molecular weight polyamines are amine-terminated polyethers such as the Jeffamine® resins available from Huntsman International, LLC.

The preparation of the polyaspartic acid ester compounds from the above-mentioned starting materials may be carried out, for example, at a temperature of 0 to 100° C. using the starting materials in such proportions that at least 1, pref-erably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents. Preferably, the polyaspartic acid ester com-pound is solvent-free.

With preference, a polyaspartic acid ester compound having a viscosity at 25° C. of from about 400 to 3000 mPa*s, preferably from about 600 to 2500 mPa*s, very preferably from about 800 to 2000 mPa*s, is utilized.

In another preferenced embodiment, the polyaspartic acid ester compound has an equivalent weight of about 200 to 500, preferably about 210 to 400, very preferably about 220 to 300.

In yet another preferred embodiment of the invention, the polyaspartic acid ester compound has an amine value from about 150 to 250, preferably about 175 to 225, and very preferably about 190 to 210 mg KOH/g.

Polyaspartic acid ester compounds that may find utility in the disclosed invention are commercially available, for example, as Desmophen® NH from Covestro.

The isocyanate-reactive component (A) may also com-prise further compounds (R) such as crosslinkable resins, oligomers or polymers having isocyanate-reactive groups and being different from the polyaspartic acid ester com-pound as described above. Examples of such further isocya-nate-reactive oligomers and polymers include (i) poly(meth) acrylates, more particularly hydroxy-functional and/or carboxylate-functional and/or amine-functional poly(meth) acrylates, (ii) polyurethanes, more particularly hydroxyfunctional and/or carboxylate-functional and/or amine-func-tional polyurethanes, (iii) polyesters, more particularly polyester polyols and polycarbonate polyols, (iv) polyethers, more particularly polyether polyols, (v) copolymers in the stated polymers, and (vi) mixtures thereof. The term "poly (meth)acrylate" refers both to polyacrylates and to polymethacrylates. Poly(meth)acrylates may therefore be composed of acrylates and/or methacrylates and may com-prise further ethylenically unsaturated monomers, such as alkyl (meth)acrylates, styrene or (meth)acrylic acid, for example. The term "(meth)acryloyl" respectively, in the sense of the present invention embraces methacryloyl com-pounds, acryloyl compounds and mixtures thereof. Prefer-ably however, no further compounds (R) are present in container C1 or in containers C1, C2, and/or C3.

The at least one polyaspartic acid ester compound is present preferably in a total amount (solids content) of more than about 50 weight %, preferably more than about 65 weight %, more preferably about 80 or 90 weight % to about 100 weight %, based in each case on the total weight of the isocyanate-reactive component (A). Most preferably, the isocyanate-reactive component (A) consists of polyaspartic acid ester compounds.

The use of the at least one isocyanate-reactive component (A), preferably as polymer resin as part of the binder, in the above-recited amounts ensures the formation of a coating layer having an excellent quality, especially adhesion, recoatability, appearance, and low-temperature cure rate.

In a preferred embodiment of the current invention, container C1 comprises a total amount of less than 10 weight %, preferably less than 5 weight %, more preferably less than 1 weight %, and most preferably no or 0 weight % solvent (S1) and/or solvent (S2), based in each case on the total weight of container C1. Hence, most preferably, con-tainer C1 is free of any solvent (S1) and/or solvent (S2).

In another preferred embodiment of the current invention, container C1 comprises a total amount of less than 10 weight %, preferably less than 5 weight %, more preferably less than 1 weight %, and most preferably no or 0 weight %, additive (AD), based in each case on the total weight of container C1. Hence, most preferably, container C1 is free of any additive (AD).

In yet another preferred embodiment of the current inven-tion, container C1 comprises a total amount of less than 10 weight %, preferably less than 5 weight %, more preferably less than 1 weight %, and most preferably no or 0 weight %, solvent (S1), solvent (S2), and/or additives (AD), based in each case on the total weight of container C1. Hence, most preferably, container C1 is free of any solvent (S1), solvent (S2) and/or additive (AD).

In a particularly preferred embodiment of the invention, container C1 comprises, preferably consists of, i) isocya-nate-reactive component (A) comprising, preferably consist-ing of, at least one polyaspartic acid ester compound and optional compounds (R), ii) optional further Additives (AD2), and iii) optional solvents (S3).

Container C2

Container C2 contains at least one polyisocyanate (B). Favorably, the polyisocyanate represents the hardener or curing agent of a multicomponent coating composition, with the hardener being one component of a multi-pack product that, mixed together, forms by chemical reaction with complementary reactive compounds, i.e. a polymer resin, a coating film having the desired properties. The isocyanate functional groups of the polyisocyanate (B) are able to undergo, under suitable reaction conditions, crosslinking reactions with the complementary isocyanate-reactive functional groups of the isocyanate-reactive component (A), such as the amino functional groups of the polyaspartic acid ester compound and functional groups of the optional further compounds (R) to form a coating or film by crosslinking of the binder. In case further compounds (R) are present, the inventive kit-of-parts may also contain further crosslinking agents which only undergo chemical reactions with the functional groups of the further compounds (R) having isocyanate-reactive groups. Polyisocyanate and polymer resin are therefore responsible for film formation and represent large parts of the binder. The term "binder" in the sense of the present invention and in agreement with DIN EN ISO 4618 (German version, date: March 2007) refers preferably to those curable nonvolatile fractions of the kit-of-parts or coating composition of the invention that are responsible for film formation upon curing, with the exception of any pigments and fillers included therein, and more particularly refers to the polyaspartic acid ester compound and optional further compound (R) responsible for film formation with the polyisocyanate (B). The nonvolatile fraction as residue by mass obtained by evaporation under specified conditions may be determined by the method described in the Examples section.

As used herein the term "polyisocyanate" refers to a compound containing two or more isocyanate groups. As used herein the term "diisocyanate" refers to a compound containing two isocyanate groups. Hence, diisocyanates are a subset of polyisocyanates With preference the isocyanate groups of the polyisocyanate (B) are unblocked, blocked, or a mixture of unblocked and blocked polyisocyanates. Unblocked isocyanate groups may also be referred to as "free" isocyanate groups.

Particular preference is given to using unblocked polyisocyanates, i.e. compounds containing at least two free isocyanate groups.

The at least one polyisocyanate (B) may comprise a combination of an aliphatic isocyanate functional material and a cycloaliphatic isocyanate functional material. The aliphatic isocyanate functional material may comprise a reaction product of an aliphatic diisocyanate and a hydroxyfunctional ether compound. The cycloaliphatic isocyanate functional material may comprise a reaction product of a cycloaliphatic diisocyanate and a mono-functional alcohol compound. The aliphatic isocyanate functional material and the cycloaliphatic isocyanate functional material may each comprise at least one functional group selected from the group consisting of isocyanurate, iminooxadiazine, uretdione, allophanate, biuret, and combinations of any thereof. The aliphatic and cycloaliphatic isocyanate functional materials may be produced from and/or comprise polyisocyanates having an isocyanate functionality greater than 2.

Isocyanurates may be prepared by the cyclic trimerization of polyisocyanates. Trimerization may be performed, for example, by reacting three (3) equivalents of a polyisocyanate to produce 1 equivalent of isocyanurate ring. The three (3) equivalents of polyisocyanate may comprise three (3) equivalents of the same polyisocyanate compound, or various mixtures of two (2) or three (3) different polyisocyanate compounds. Compounds, such as, for example, phosphines, Mannich bases and tertiary amines, such as, for example, 1,4-diaza-bicyclo[2.2.2]octane, dialkyl piperazines, and the like, may be used as trimerization catalysts. Iminooxadiazines may be prepared by the asymmetric cyclic trimerization of polyisocyanates. Uretdiones may be prepared by the dimerization of a polyisocyanate. Allophanates may be prepared by the reaction of a polyisocyanate with a urethane.

Biurets may be prepared via the addition of a small amount of water to two equivalents of polyisocyanate and reacting at slightly elevated temperature in the presence of a biuret catalyst. Biurets may also be prepared by the reaction of a polyisocyanate with a urea.

Polyisocyanates that may find utility in the production of isocyanurates, iminooxadiazines, biurets, uretdiones and allophanates, and which may find utility in the production of aliphatic and cycloaliphatic isocyanate functional materials as a polyisocyanate for use as crosslinker with the polymer resin comprising at least a polyaspartic acid ester, may include aliphatic and cycloaliphatic diisocyanates, such as, for example, ethylene diisocyanate; 2,2',5 trimethylhexane diisocyanate; 1,4-tetramethylene diisocyanate; 1,6-hexamethylene diisocyanate ("HDI"); 4,4'-diisocyanatocyclohexylmethane ("HMDI"), 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or "IPDI"); bis-(4-isocyanatocyclohexyl)methane CH 12 MDI"); bis-(4-isocyanato-3-methylcyclohexyl)methane, 1,1,6,6-tetramethyl-hexamethylene diisocyanate; p- or m-tetramethylxylylene diisocyanate; and combinations of any thereof. Flexibility of the before mentioned polyisocyanates may be improved by chain extension of said aliphatic and cycloaliphatic polyisocyanates with polyols and/or polyesters, such as, in example, polyol and/or polyester chain extended HDI and IPDI commercially available as Duranate™ from Asahi Kasei. Additional polyisocyanates (including various diisocyanates) that may also find utility in the production of aliphatic and cycloaliphatic isocyanate functional materials may include the polyisocyanates described in U.S. Pat. Nos. 4,810,820; 5,208,334; 5,124,427; 5,235,018; 5,444,146; and 7,038,003, each of which is incorporated in its entirety by reference herein. Combinations of any of the above-identified and incorporated polyisocyanates may also be used to produce the aliphatic and cycloaliphatic isocyanate functional materials The polyisocyanate (B) may comprise as aliphatic isocyanate functional materials an aliphatic isocyanate polymer based on hexamethylene diisocyanate trimer (HDI homopolymer), preferably having an NCO content of more than 15, and/or an aliphatic isocyanate polymer based on hexamethylene diisocyanate (HDI), preferably having an NCO content of more than 10.

In a preferred embodiment of the invention, the polyisocyanate (B) may comprise, preferably consist of, a first aliphatic isocyanate functional material having a viscosity at 25° C. of from about 80 mPa*s to 500 mPa*s, preferably about 100 to 300 mPa*s, a second aliphatic isocyanate functional material having a viscosity at 25° C. of from about 500 mPa*s to 1500 mPa*s, preferably about 800 mPa*s to 1300 mPa*s, and a cycloaliphatic isocyanate functional material.

The HDI-based aliphatic isocyanate functional material may comprise an average isocyanate functionality of at least 4, a glass transition temperature of less than −40° C., and/or a % NCO of less than 10% by weight. The HDI-based aliphatic isocyanate functional material may be essentially free of HDI isocyanurate trimer.

The polyisocyanate (B) may comprise an IPDI-based cycloaliphatic isocyanate functional material with an average isocyanate functionality of at least 2.3, a glass transition temperature between 25° C. and 65° C., and/or a % NCO of 10% to 47% by weight.

In a preferenced embodiment of the invention, the at least one polyisocyanate (B) is present in a total amount of about 1 to 60% by weight, preferably about 5 to 50% by weight, more preferably about 10 to 40% by weight, very preferably about 15 to 40% by weight, based in each case on the total weight of the kit-of-parts.

In another preferenced embodiment of the invention, the at least one polyisocyanate (B) comprises at least one, preferably at least two, aliphatic isocyanate functional materials and at least one cycloaliphatic isocyanate functional material, wherein preferably the cycloaliphatic isocyanate functional material is present in a total amount of more than about 50 weight %, preferably more than about 60 weight %, very preferably more than about 70 weight %, based in each case on the total weight of the aliphatic and cycloaliphatic isocyanate functional materials contained in polyisocyanate (B).

In a preferred embodiment of the current invention, container C2 comprises a total amount of less than 10 weight %, preferably less than 5 weight %, more preferably less than 1 weight %, and most preferably no or 0 weight %, of solvent (S1) and/or additive (AD), based in each case on the total weight of container C2. Hence, most preferably, container C2 is free of any solvent (S1) and/or additive (AD).

In another preferred embodiment of the current invention, container C2 comprises a total amount of less than 10 weight %, preferably less than 5 weight %, more preferably less than 1 weight %, and most preferably no or 0 weight %, of solvent (S2), based in each case on the total weight of container C2. Hence, most preferably, container C2 is free of any solvent (S2).

In yet another preferred embodiment of the current invention, container C2 comprises a total amount of less than 10 weight %, preferably less than 5 weight %, more preferably less than 1 weight %, and most preferably no or 0 weight %, of solvent (S1), solvent (S2), and/or additives (AD), based in each case on the total weight of container C2. Hence, most preferably, container C2 is free of any solvent (S1), solvent (S2) and/or additive (AD).

In a particularly preferred embodiment of the invention, container C2 comprises, preferably consists of, i) polyisocyanate (B), ii) optional further Additives (AD2), and iii) optional solvents (S3).

Container C3

Container C3 contains at least one solvent (S1). Solvents (S1) in the sense of the present invention and in agreement with DIN EN ISO 4618 (English version, date: January 2015) refers preferably to a single liquid or blend of liquids, volatile under specified conditions of use, added to a coating material or composition to reduce viscosity or influence other properties. Solvent (S1) may therefore represent a thinner.

Container C3 contains at least one solvent (S1) selected from monoalcohols and alkoxymonoalcohols, preferably alkoxymonoalcohols.

Monoalcohols according the invention are organic compounds carrying one hydroxyl functional group (OH) bound to a saturated carbon atom, wherein the saturated carbon atom is part of an alkyl group R. Said monoalcohols may be represented by the general formula R—OH and include primary ($RCH_2OH$), secondary ($R_2CHOH$) and tertiary ($R_3COH$) alcohols.

Alkoxymonoalcohols according the invention are organic compounds of general formula R"—O—R'OH, wherein R' and R" represent alkyl groups. Hence, alkoxymonoalcohols may also be described as organic compounds wherein an alkoxygroup having a general formula R"—O is bound to a monoalcohol represented by the general formula R'—OH.

The alkyl groups R, R', and R" of the general formulas representing monoalcohols and alkoxymonoalcohols according the invention are independent from each other any series of univalent radicals of the general formula $C_mH_{2m+1}$ derived from aliphatic hydrocarbons. As used herein, the term "aliphatic" refers to organic compounds characterized by substituted or unsubstituted straight, branched, and/or cyclic chain arrangements of constituent carbon atoms. Aliphatic compounds do not contain aromatic rings as part of the molecular structure of the compounds. As used herein, the term "cycloaliphatic" refers to organic compounds characterized by arrangement of carbon atoms in closed ring structures. Cycloaliphatic compounds do not contain aromatic rings as part of the molecular structure of the compounds. Hence, cycloaliphatic compounds are a subset of aliphatic compounds. Accordingly, an aliphatic composition may comprise an aliphatic compound and/or a cycloaliphatic compound.

With preference in this invention, alkyl groups R, R', and R" of the monoalcohols and alkoxymonoalcohols are derived from unsubstituted aliphatic hydrocarbons, having a straight or branched arrangement of constituent carbon atoms.

Particular preference is given in this invention to alkyl groups R and R" of the monoalcohols and alkoxymonoalcohols derived from unsubstituted aliphatic hydrocarbons, having a straight or branched arrangement of constituent carbon atoms, containing 1 or more, more preferably 2 to 6, even more preferably 3 to 4, or most preferably 4 carbon atoms, and alkyl groups R' derived from unsubstituted aliphatic hydrocarbons, having a straight arrangement of constituent carbon atoms, containing 1 or more, more preferably 2 to 6, even more preferably 2 to 3, or most preferably 2 carbon atoms.

Non-limiting examples of monoalcohols especially suitable according the invention as solvent (S1) are methanol, ethanol, n- and iso-propanol, as well as butanol including 1-butanol (n-butanol), 2-butanol (sec-butanol), 2-methyl-propan-1-ol (iso-butanol), and 2-methylpropanol (tert-butanol), with a particular preference for n- and iso-propanol, as well as n-, sec-, and iso-butanol, most preferably iso-butanol.

Non-limiting examples of alkoxymonoalcohols especially suitable according the invention as solvent (S1) are glycol ethers, wherein glycol ethers are a group of organic compounds based on alkyl ethers of ethylene glycol or propylene glycol, in example 2-butoxyethanol.

In a most preferred embodiment of the present invention, solvent (S1) is selected from 2-methylpropan-1-ol (iso-butanol) and 2-butoxyethanol.

With preference, the at least one solvent (S1) is present in a total amount of up to 30% by weight, preferably from 0.01 to 20% by weight, very preferably from 0.1 to 10% by weight, based in each case on the total weight of the kit-of-parts.

In another preferenced embodiment of the invention, solvent (S1) is present in container C3 in a total amount of more than 80 weight %, preferably more than 90 weight %, more preferably 95 or 98 weight % to 100 weight %, most preferably 100 weight %, based in each case on the total weight of solvent (S1) in the kit-of-parts. Hence, most preferably, the total amount of solvent (S1) present in the total weight or entirety of the kit-of-parts is comprised in container C3.

In yet another preferenced embodiment of the invention, container C3 comprises, preferably consists of, i) solvent (S1), ii) additives (AD), iii) optional solvent (S2), iv) optional solvent (S3), and v) optional Additives (AD2).

Solvent (S2)

The inventive kit-of-parts can additionally comprise in containers C2 and/or C3 at least one solvent (S2), wherein solvent (S2) represents a ketone. If present, solvent (S2) is with preference contained in container C3. Solvents (S2) in the sense of the present invention and in agreement with DIN EN ISO 4618 (English version, date: January 2015) refers preferably to a single liquid or blend of liquids, volatile under specified drying conditions and in which the binder is soluble. Solvents (S2) are liquid at room temperature (i.e. 23° C.).

Ketones according the invention are organic compounds having a functional group represented by the general formula $R^aC(=O)R^b$, where $R^a$ and $R^b$ are a variety of carbon-containing substituents directly bound to a carbonyl group $C=O$ (a carbon-oxygen double bond), including symmetrical (substituents $R^a$ and $R^b$ are identical) and asymmetrical ketones (substituents $R^a$ and $R^b$ are different or not identical). With preference, ketones according the invention are asymmetrical.

With preference, carbon-containing substituents $R^a$ and $R^b$ according the invention are alkyl groups. An alkyl group $R^a$ or $R^b$ according the invention is any series of univalent radicals of the general formula $C_pH_{2p+1}$ derived from aliphatic hydrocarbons. Hence, alkyl groups $R^a$ and $R^b$ are saturated groups. As used herein, the term "aliphatic" refers to organic compounds characterized by substituted or unsubstituted straight, branched, and/or cyclic chain arrangements of constituent carbon atoms. Aliphatic compounds do not contain aromatic rings as part of the molecular structure of the compounds. As used herein, the term "cycloaliphatic" refers to organic compounds characterized by arrangement of carbon atoms in closed ring structures. Cycloaliphatic compounds do not contain aromatic rings as part of the molecular structure of the compounds. Hence, cycloaliphatic compounds are a subset of aliphatic compounds. Accordingly, an aliphatic composition may comprise an aliphatic compound and/or a cycloaliphatic compound.

With preference in this invention, alkyl groups $R^a$ and $R^b$ are any series of univalent radicals of the general formula $C_pH_{2p+1}$ derived from unsubstituted aliphatic hydrocarbons, having a straight or branched arrangement of constituent carbon atoms.

Particular preference is given in this invention to alkyl groups $R^a$ and $R^b$ being independent from each other any series of univalent radicals of the general formula $C_pH_{2p+1}$ derived from unsubstituted aliphatic hydrocarbons, having a straight or branched arrangement of constituent carbon atoms, wherein $R^a$ and/or $R^b$ are alkyl groups $C_pH_{2p+1}$ containing 1 or more, more preferably 1 to 5, even more preferably 1 or 5 carbon atoms.

Particular preference is given in this invention to alkyl groups $R^a$ and $R^b$ being independent from each other any series of univalent radicals of the general formula $C_pH_{2p+1}$ derived from unsubstituted aliphatic hydrocarbons, having a straight or branched arrangement of constituent carbon atoms, wherein $R^a$ and/or $R^b$ are alkyl groups $C_pH_{2p+1}$ containing 1 or more, more preferably 1 to 5, even more preferably 1 or 5 carbon atoms.

In another preferred embodiment of the invention, ketones according the invention are asymmetrical and have functional groups $R^a$ and $R^b$, wherein $R^a$ and $R^b$ are independent from each other any series of univalent radicals of the general formula $C_pH_{2p+1}$ derived from unsubstituted aliphatic hydrocarbons, having a straight or branched arrangement of constituent carbon atoms, wherein $R^a$ and/or $R^b$ are alkyl groups $C_mH_{2m+1}$ containing 1 or more, more preferably 1 to 5, even more preferably 1 or 5 carbon atoms.

In another preferred embodiment of the invention, solvents (S2) are selected from asymmetrical ketones represented by the general formula $R^aC(=O)R^b$, wherein $R^a$ and $R^b$ are not identical alkyl groups directly bound to a carbonyl group $C=O$ (a carbon-oxygen double bond), wherein $R^a$ (or $R^b$ respectively) is any series of univalent radicals of the general formula $C_pH_{2p+1}$ derived from unsubstituted aliphatic hydrocarbons, having a straight arrangement of constituent carbon atoms containing 1 to 4, preferably 1 to 3, more preferably 1 or 2, most preferably 1 carbon atom, and wherein $R^b$ (or $R^a$ respectively) is any series of univalent radicals of the general formula $C_pH_{2p+1}$ derived from unsubstituted aliphatic hydrocarbons, having a straight or branched, preferably branched, arrangement of constituent carbon atoms containing 1 to 6, preferably 3 to 6, more preferably 4 or 5 to 6, most preferably 5 carbon atoms.

Non-limiting examples of ketones especially suitable according the invention as solvents (S2) are therefore selected from asymmetrical ketones represented by the general formula $R^aC(=O)R^b$, wherein $R^a$ is a substituent selected from methyl, ethyl, n- and iso-propyl, as well as butyl including n-butyl, butan-2-yl (sec-butyl), 2-methyl-propyl (iso-butyl), and tert-butyl, with a particular preference for methyl, and $R^4$ is a substituent selected from methyl, ethyl, n- and iso-propyl, pentyl including n-pentyl, 2-methylbutan-2-yl (tert-pentyl), 2,2-dimethylpropyl (neo-pentyl), 3-methylbutyl (iso-pentyl)), pentan-2-yl (sec-pentyl), pentan-3-yl (3-pentyl), 3-methylbutan-2-yl (sec-isopentyl), and 2-methylbutyl (active pentyl), as well as hexyl including n-, iso-, tert-, and neo-hexyl, with a particular preference n-pentyl, 2-methylbutan-2-yl (tert-pentyl), 2,2-dimethylpropyl (neo-pentyl), and 3-methylbutyl (iso-pentyl)).

In a most preferred embodiment of the present invention, solvent (S2) is 5-methylhexan-2-one (MIAK).

If solvent (S2) is comprised in the kit-of-parts at all, the at least one solvent (S2) is with preference present in a total amount of up to 30% by weight, preferably of up to 20% by weight, very preferably of up to 10% by weight, based in each case on the total weight of the kit-of-parts.

In another preferenced embodiment of the invention, solvent (S2) is present in container C2 and/or container C3, preferably container C3, in a total amount of more than 80 weight %, preferably more than 90 weight %, more preferably 95 or 98 weight % to 100 weight %, most preferably 100 weight %, based in each case on the total weight of solvent (S2) in the kit-of-parts. Hence, most preferably, the total amount of solvent (S2) present in the total weight or entirety of the kit-of-parts is contained in container C2 and/or container C3, preferably container C3.

In yet another preferenced embodiment of the invention, container C1 and/or container C2 contain a total amount of less than 5 weight %, preferably less than 1 weight %, very preferably no or 0 weight % solvent (S2), based in each case on the total weight of container C1 and/or container C2. Most preferably, container C1 and container C2 contain no or are free of solvent (S2).

Hence, another preferred embodiment of the invention is a kit-of-parts for preparation of a curable coating composition, comprising three separate containers C1, C2, and C3, wherein a) the container C1 contains an isocyanate-reactive component (A) comprising a polyaspartic acid ester compound b) the container C2 contains a polyisocyanate (B);

c) the container C3 contains a solvent (S1); and wherein container C2 and/or container C3, preferably container C3, contain a solvent (S2); and wherein container C1 and/or container C3, preferably container C3, optionally contain an additive (AD);

characterized in that solvent (S1) is selected from mono-alcohols and alkoxymonoalcohols, preferably alkoxy-monoalcohols; and solvent (S2) is a ketone; and additive (AD) is selected from UV absorbers and hindered amine light stabilizers.

Solvent (S3)

The inventive kit-of-parts can additionally comprise in any one of containers C1, C2, and/or C3 at least one further solvent (S3) selected from the class of "solvents", "diluents" and "thinners" different or not identical to solvent (S1) and solvent (S2) which are commonly used in solvent-based coating compositions, such as butyl acetate, 1-Methoxy-2-propanyl acetate (MPA), toluene, xylene, solvent naphtha, Solvesso 100 or Hydrosol® (from APAL), esters, such as ethyl acetate, butyl acetate, pentyl acetate or ethyl ethoxy-propionate, amides, methylal, butylal, 1,3-dioxolane, glyc-erol formal, hydrocarbons and mixtures thereof. Preferred organic solvents (S3) are esters, very preferably n-butyl acetate and/or 1-methoxypropyl acetate and/or 2-butoxy-ethylacetat.

The term "diluent" in the sense of the present invention and in agreement with DIN EN ISO 4618 (English version, date: January 2015) refers preferably to a volatile liquid, single or blended, which, whilst not a "solvent" in which the binder is soluble, may be used in conjunction with the "solvent" in which the binder is soluble without causing any deleterious effects. The terms "thinner" and "solvent" according the invention have been defined further above in the sections of solvent (S1) and solvent (S2).

Solvent (S1), solvent (S2) and solvent (S3) are different from each other, or, in other words, not identical compounds.

Additive (AD)

Container C1 and/or C3, preferably container C3, of the inventive kit-of-parts may comprise one or more additives (AD) selected from UV-absorbers (UVA) and/or hindered amine light stabilizers (HALS).

UV absorbers (UVA) are in general organic molecules capable of absorbing harmful UV light and converting it into harmless heat and may include UV absorber from the classes of 2-(2-hydroxyphenyl)-benzotriazoles (BTZ), 2-hydroxy-benzophenones (BP), hydroxyphenyl-s-triazines (HPT), and oxanilides, or mixtures thereof. UVA suitable for use in the inventive kit-of-parts are all commercially available UVA known to the skilled person for use in polymers and paints and are described for example in VALET Andreas, BRAIG Adalbert, Light Stabilizers for Coatings, Hannover: Vin-centz Network, 2017, 2$^{nd}$ Revised Edition, pages 23 to 35, the entire disclosure of which is hereby incorporated by reference. UV absorbers that may find utility in the disclosed invention are commercially available, for example, as Tinu-vin® from BASF.

With preference the UVA is selected from the UV absorber class of 2-(2-hydroxyphenyl)-benzotriazoles (BTZ). An example of such a preferred UV-absorber (UVA) includes but is not limited to Tinuvin® 384.

Hindered amine light stabilizers (HALS) are sterically hindered amines used to stabilize commercial polymers and are most commonly derivatives of 2,2,6,6-tetramethylpip-eridine. HALS for use in the inventive kit-of-parts are all commercially available HALS known to the skilled person for use in polymers and paints and are described for example in VALET Andreas, BRAIG Adalbert, Light Stabilizers for Coatings, Hannover: Vincentz Network, 2017, 2$^{nd}$ Revised Edition, pages 36 to 45, the entire disclosure of which is hereby incorporated by reference. HALS that may find utility in the disclosed invention are commercially available, for example, as Tinuvin® from BASF.

Preferred HALS include but are not limited to Tinuvin® 123, Tinuvin® 144, and Tinuvin® 292, all commercially available from BASF.

In a particularly preferred embodiment of the invention, additive (AD) is selected from UVA and/or HALS, wherein the UVA is a 2-(2-hydroxyphenyl)-benzotriazole and the HALS is a mixture of Bis (1, 2, 2, 6, 6-pentamethyl-4-piperidyl) sebacate & methyl 1, 2, 2, 6, 6-pentamethyl-4-piperidyl sebacate.

If present, the at least one additive (AD) is with prefer-ence comprised in a total amount of 0.001 to 10% by weight, preferably in a total amount of 0.01 to 5% by weight, very preferably in a total amount of 0.1 to 1% by weight, based in each case on the total amount of the kit-of-parts.

In a further preferenced embodiment of the invention, additives (AD) are, if present at all, contained in container C1 and/or container C3, preferably container C3, in a total amount of more than 80 weight %, preferably more than 90 weight %, more preferably 95 or 98 weight % to 100 weight %, most preferably 100 weight %, based in each case on the total weight of additive (AD) in the kit-of-parts. Hence, most preferably, the total amount of additives (AD) if present in the total weight or entirety of the kit-of-parts is contained in container C1 and/or container C3, preferably container C3.

In yet another preferenced embodiment of the invention, container C2 contains a total amount of less than 5 weight %, preferably less than 1 weight %, very preferably no or 0 weight % of additives (AD), based in each case on the total weight of container C2. Most preferably, container C2 contains no additives (AD).

Hence, another preferred embodiment of the invention is a kit-of-parts for preparation of a curable coating composi-tion, comprising three separate containers C1, C2, and C3, wherein a) the container C1 contains an isocyanate-reactive component (A) comprising a polyaspartic acid ester compound;

b) the container C2 contains a polyisocyanate (B);

c) the container C3 contains a solvent (S1); and wherein container C2 and/or container C3, preferably container C3, optionally contain a solvent (S2); and wherein container C1 and/or container C3, preferably container C3, contain an additive (AD);

characterized in that solvent (S1) is selected from mono-alcohols and alkoxymonoalcohols, preferably alkoxy-monoalcohols; and solvent (S2) is a ketone; and additive (AD) is selected from UV absorbers and hindered amine light stabilizers.

Another explicitly preferred embodiment of the invention is a kit-of-parts for preparation of a curable coating com-position, comprising three separate containers C1, C2, and C3, wherein a) the container C1 contains an isocyanate-reactive component (A) comprising a polyaspartic acid ester compound;

b) the container C2 contains a polyisocyanate (B);

c) the container C3 contains a solvent (S1); and wherein container C2 and/or container C3, preferably container C3, contain a solvent (S2); and wherein container C1 and/or container C3, preferably container C3, contain an additive (AD);

characterized in that solvent (S1) is selected from monoalcohols and alkoxymonoalcohols, preferably alkoxymonoalcohols; and solvent (S2) is a ketone; and additive (AD) is selected from UV absorbers and hindered amine light stabilizers.

Yet another explicitly preferred embodiment of the invention is a kit-of-parts for preparation of a curable coating composition, comprising three separate containers C1, C2, and C3, wherein a) the container C1 contains an isocyanate-reactive component (A) comprising a polyaspartic acid ester compound b) the container C2 contains a polyisocyanate (B);

c) the container C3 contains a solvent (S1); and wherein container C3 contains a solvent (S2); and wherein container C3 contains an additive (AD);

characterized in that solvent (S1) is selected from monoalcohols and alkoxymonoalcohols, preferably alkoxymonoalcohols; and solvent (S2) is a ketone; and additive (AD) is selected from UV absorbers and hindered amine light stabilizers.

Further Additives (AD2)

The inventive kit-of-parts can additionally comprise in any one of containers C1, C2, and/or C3 at least one further Additive (AD2), customary contained in coating compositions, preferably clear coating compositions. Additives (AD2) are not identical with additives (AD). Examples of Additives (AD2) are:

slip additives, nanoparticle dispersions of surface-treated silica antioxidants, such as sterically hindered phenol antioxidant and organophosphate antioxidant, polymerization inhibitors, defoamers, wetting agents such as siloxanes, fluorine compounds, carboxylic monoesters, phosphoric esters, polyacrylic acids and their copolymers, or polyurethanes;

adhesion promoters such as tricyclodecanedimethanol, flow control agents, film-forming assistants such as cellulose derivatives, fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252, rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium, and sodium-magnesium-fluorine-lithium phyllosilicates of the montmorillonite type; silicas such as Aerosils®; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates, flame retardants and/or water scavengers.

Curing catalyst pigments

It may be advantageous in accordance with the invention if the kit-of-parts comprises in any one of containers C1, C2, and/or C3 at least one Additive (AD2) selected from a curing catalyst. Said curing catalyst serves primarily to catalyze the reaction between the functional groups of the polyisocyanate (B) and the complementary reactive functional groups of the at least one isocyanate-reactive component (A) such as the polyaspartate ester-based compound or further compounds (R). The at least one catalyst is preferably selected from bismuth carboxylates, lithium carboxylates, tin carboxylates, tin mercaptides, zirconium chelates, aluminum chelates, zinc complexes, zinc carboxylates, tertiary amines, and mixtures thereof, more preferably from tin carboxylates, very preferably from dioctyltin dilaurate and/or 1,4-diazabicyclo[2.2.2]octane.

Furthermore, it may be advantageous in accordance with the invention if the inventive kit-of-parts comprises in any one of containers C1, C2, and/or C3, preferably container C1, at least one Additive (AD2) selected from dispersions of surface-treated silica nanoparticles. Said dispersions of surface-treated silica nanoparticles are for example commercially available from BYK Additives & Instruments as NanoBYK, i.e. NanoBYK 3650 and 3652. With preference, such additives (AD2) selected from dispersions of surface-treated silica nanoparticles are present in a total amount of 0.5 to 5.0% by weight, more preferably from 0.9 to 4.5% by weight, even more preferably from 1.5 to 3.0% by weight, based in each case on the total amount of the inventive kit-of-parts.

Preferably, the inventive kit-of-parts does not contain additional antioxidants or no antioxidant component comprising sterically hindered phenol antioxidant and/or organophosphate antioxidant.

In another preferred embodiment of the invention, the kit-of-parts does not comprise any hydroperoxide decomposer.

The at least one Additive (AD2) is preferably present in a total amount of up to 30% by weight, very preferably of up to 20% by weight, based in each case on the total amount of the inventive kit-of-parts.

The inventive kit-of-parts may also be used to prepare basecoats, topcoats or primers. The inventive kit-of-parts can thus contain pigments, including effect pigments, and optionally fillers.

Nonlimiting examples of effect pigments that may be utilized in basecoat and topcoat coating compositions include metallic, pearlescent, and color-variable effect flake pigments. Metallic (including pearlescent, and color-variable) topcoat colors are produced using one or more special flake pigments. Metallic basecoat colors may be produced using metallic flake pigments like aluminum flake pigments, coated aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance (degree of reflectance or color) when viewed at different angles. Metal flakes may be cornflake type, lenticular, or circulation-resistant; micas may be natural, synthetic, or aluminum oxide type. Flake pigments do not agglomerate and are not ground under high shear because high shear would break or bend the flakes or their crystalline morphology, diminishing or destroying the gonioapparent effects. The flake pigments are satisfactorily dispersed in a binder component by stirring under low shear. The flake pigment or pigments may be included in coating composition in an amount of about 0.01 wt. % to about 50 wt. % or about 15 wt. % to about 25 wt. %, in each case based on total binder weight. Nonlimiting examples of commercial flake pigments include PALIOCROME® pigments, available from BASF Corporation.

Nonlimiting examples of other suitable pigments and fillers that may be utilized in basecoat and monocoat topcoat coating compositions include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide or zirconium oxide, and so on. The pigment or pigments are preferably dispersed in a resin or polymer or with a pigment dispersant, such as binder resins of the kind already described, according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments and fillers may be utilized in amounts typically of up to about 60% by weight, based on total weight of the coating composition. The amount of pigment used depends on the nature of the pigment and on the depth of the color and/or the intensity of the effect it is intended to produce, and also by the dispersibility of the pigments in the pigmented coating composition. The pigment content, based in each case on the total weight of the pigmented coating composition, is preferably 0.5% to 50%, more preferably 1% to 30%, very preferably 2% to 20%, and more particularly 2.5% to 10% by weight.

In particularly preferably embodiments of the invention, the inventive kit-of-parts may also be used to prepare transparent pigmented topcoat coating compositions (tinted clearcoats), and clearcoat coating compositions that do not include a pigment. The inventive kit-of-parts can therefore also contain glass flakes required for making transparent pigmented topcoat coatings. The glass flakes are preferably present in an amount of 0.001 to 0.8% by weight, based on the total weight of the coating composition. Such tinted clearcoats are being used more frequently to expand the palette of decorative effects which can be achieved when coating vehicles or other surfaces with a coating, preferably a multilayer coating.

Inventive Coating Composition Prepared from the Inventive Kit-of-Parts

The inventive coating compositions are multi-pack products, wherein the term "multi-pack products" describes coating materials or coating compositions that are supplied in two or more, such as three, separate components or containers which have to be mixed before use in the proportions specified by the manufacturer.

Generally, the polymer resin and the hardener or curing agent of such a multi-pack product may only be mixed together shortly before application. The term "shortly before application" is well known to the person skilled in the art. The time period within which the ready-to-use coating composition may be prepared by mixing the components prior to the actual application depends on the pot life of the coating application.

Coating compositions according the invention are prepared from the inventive kit-of-parts by mixing at least the three separate containers C1, C2, and C3 of the kit-of-parts. Coating compositions prepared in this fashion are ready-to-use for application.

With preference, the inventive coating composition prepared form the inventive kit-of-part is a clearcoat coating composition.

In certain embodiments of the invention, the coating composition may be prepared from the inventive kit-of-parts comprising containers C1, C2, and C3, by mixing container C1 comprising the isocyanate-reactive component (A) comprising at least one polyaspartic acid ester compound, preferably consisting of polyaspartic acid ester compounds, and container C2 comprising the polyisocyanate (B), at an NH:NCO ratio of from about 0.5:10 to 10:0.5, in some embodiments from about 0.5:5 to 5:0.5, in some embodiments from about 0.5:3 to 3:0.5, in some embodiments from about 0.5:1.5 to 1.5:0.5, and in some embodiments from 1:1. If the isocyanate reactive component (A) contains in addition to the polyaspartic acid ester-compound also further compounds (R) having isocyanate-reactive groups, such as OH groups, the skilled person is able to adjust the amount of NH functional groups of the polyaspartic acid ester compound in view of the additional isocyanate-reactive functional groups of the further compound (R), such as OH groups, to comply with the above described ratio of NH and further isocyanate-reactive groups:NCO.

In another preferred embodiment of the invention, the coating composition may be prepared from the inventive kit-of-parts by mixing containers C1, C2, and C3 in a volume ratio v/v/v of from about 100:90:5 to 100:110:50, preferably from about 100:100:20 to 100:100:40.

Mixing may take place manually, with the appropriate amount of a first component A) being introduced into a vessel, admixed with the corresponding quantity of the second component B), third component C) and optionally further components. However, mixing of the three or more components can also be performed automatically by means of an automatic mixing system. Such an automatic mixing system can comprise a mixing unit, more particularly a static mixer, and also at least three devices for supplying the isocyanate-reactive component (A), the polyisocyanate containing second component (B), and solvent (S1), more particularly gear pumps and/or pressure valves. The static mixer may be a commercially available helical mixer, which is installed into the material supply line about 50 to 100 cm ahead of the atomizer. Preferably 12 to 18 mixing elements (for each element 1 cm in length, diameter 6 to 8 mm) are used in order to obtain sufficient mixing of the three components. In order to prevent clogging of the material supply line, it is preferred if the mixing unit is programmed so that not only the helical mixer but also the downstream hose line and the atomizer are flushed with the first component every 7 to 17 minutes. Where the composition is applied by means of robots, this flushing operation takes place when the robot head is in a pre-defined position of rest. Depending on the length of the hose line, about 50 to 200 ml are discarded into a catch vessel. A preferred alternative to this procedure is the semi continuous conveying of mixed release agent composition. If composition is forced out regularly (every 7 to 17 minutes, likewise into a catch vessel), it is possible to reduce the quantity of discard material to a minimum (about 10 to 50 ml). Furthermore, provision may be made for the hose line from the mixer to the atomizer, and also the atomizer, to be flushed. This flushing operation is preferred in particular after prolonged downtime of the system or at the end of a shift, in order thus to ensure a long lifetime of the equipment and continuous quality of the composition.

Both in the case of manual mixing and in the case of the supply of the components for automatic mixing, the separate components preferably each possess temperatures of 15 to 70° C., more preferably 15 to 40° C., more particularly 20 to 30° C.

The inventive coating composition is a film forming composition and is suitable as clearcoat, basecoat, topcoat or primer. The inventive coating composition can thus contain pigments, including effect pigments, glass flakes, and optionally fillers.

Particularly preferably embodiments of the inventive coating composition are in the form of transparent pigmented topcoat coating compositions (tinted clearcoats), and clearcoat coating compositions that do not include a pigment.

What has been said about the kit-of-parts according to the invention applies mutatis mutandis with respect to further preferred embodiments of the inventive coating composition, especially with respect to preferred embodiments of the isocyanate-reactive component (A) comprising at least one polyaspartic acid ester compound and optional further compounds (R), polyisocyanate (B), solvent (S1), additive (AD), and optional components such as solvent (S2), solvent (S3), and Additives (AD2) including dispersions of surface-treated silica nanoparticles and/or catalysts.

Inventive Process for Preparing at Least One Coating, Preferably a Multilayer Coating, on a Substrate The coating composition prepared form the inventive kit-of-parts or the inventive coating composition is preferably used as a clearcoat composition in a process to prepare a coating, preferably a multilayer coating, on a substrate.

A third subject matter of the present invention is therefore a process for producing at least one coating on a substrate (S), the process comprising the following steps:

Step (1): optional application of at least one basecoat composition to at least a part of the substrate (S) to form at least one basecoat layer;

Step (2): application of a coating composition prepared from the inventive kit-of-parts or the inventive coating composition to at least a part of the substrate (S) to be coated or directly to the at least one basecoat layer formed in step (1) to form a coating layer, preferably a clearcoat layer;

Step (3): curing the coating layer formed in step (2), or jointly curing the at least one basecoat layer formed in step (1), if present, and the coating layer formed in step (2).

Step (1):

In optional step (1) of the inventive coating process, a basecoat composition is applied on at least a part of a substrate (S) to form a basecoat layer. The formation of a coating layer is preferably performed by flashing-off the applied coating composition. This means the active or passive evaporation of volatile organic compounds such as thinners, diluents and solvents present in the composition, usually at a temperature in the range of for example 5 to 120° C., preferably 5 to 45° C. or 15 to 25° C., at a relative humidity from about 10 to 100%, preferably from about 40 to 70%, for a duration of 30 seconds to 30 minutes. The composition is still flowable directly after application and at the start of the flashing-off and can therefore form a uniform, smooth coating film during the flash-off phase. The layer obtained from the coating composition after flashing-off, however, is not yet in the ready-to-use state. While it is indeed, for example, no longer fluid, it is still soft or tacky, and may have undergone only partial drying. One may also refer to the dust free time. In particular, the layer obtained from the coating composition is not yet cured, as described below.

Step (2):

In step (2) of the inventive coating process, the coating composition prepared from the inventive kit-of-parts or the inventive coating composition as previously described is applied to at least a part of the substrate (S) or, in case a basecoat composition was applied on at least a part of the substrate (S) in step (1), preferably directly to the at least partially dried basecoat layer, to form a coating layer, preferably a clearcoat layer. The formation of a coating layer being preferably as described above for formation of the basecoat layer, that is preferably performed by flashing-off the applied coating composition prepared from the inventive kit-of-parts or the inventive coating composition. This means the active or passive evaporation of volatile organic compounds such as thinners, diluents and solvents present in the composition, usually at a temperature in the range of for example 5 to 120° C., preferably 5 to 45° C. or 15 to 25° C., at a relative humidity from about 10 to 100%, preferably from about 40 to 70%, for a duration of 30 seconds to 30 minutes (dust free time). The composition is still flowable directly after application and at the start of the flashing-off and can therefore form a uniform, smooth coating film during the flash off phase. The layer obtained from the coating composition after flashing-off, however, is not yet in the ready-to-use state. While it is indeed, for example, no longer fluid, it is still soft or tacky, and may have undergone only partial drying. In particular, the layer obtained from the coating composition is not yet cured, as described below.

Preferably, if a basecoat composition is applied in step (1), the application of a coating composition prepared from the inventive kit-of-parts or of the inventive coating composition in step (2) is performed wet-on-wet. The technique of wet-on-wet application is known to the person skilled in the art, meaning a technique whereby a further coating composition is applied before the previous one has completely dried or has been cured, and the composite film then dries as a single entity.

In an alternative embodiment, the basecoat layer may also be dried and cured before application of a coating composition prepared from the inventive kit-of-parts or of the inventive coating composition.

Step (3):

In step (3) of the inventive process, in a first alternative, the coating compositions applied in step (2) are cured or, in a second alternative, the coating compositions applied in step (1) and (2) are jointly cured. This refers to the conversion of these coating compositions and polymeric materials into the ready-to-use state, meaning a state in which the component comprising said cured compositions and polymeric materials can be used and transported as intended. The cured compositions and polymeric materials are, therefore, in particular no longer soft or tacky, having instead been conditioned to a solid coating film, solid polymeric material or solid component, respectively. Even on further exposure to crosslinking conditions, the film or material or component no longer exhibits any substantial change in its properties such as hardness or adhesion.

In case of the compositions applied in step (1) and/or (2), curing is affected by chemically curing. In the context of the present invention, "chemically curable" and, respectively, the term "chemical curing" refer to the crosslinking of the composition (formation of a cured composition) that is initiated by chemical reaction of the functional groups of isocyanate reactive compound (A), polyisocyanate (B) and optionally further reactive compounds. In curing of a composition labeled as being chemically curable, there will of course always be some physical curing, referring to the interloping of polymer chains. The physical curing may even account for the major proportion. Nevertheless, a composition of this kind, if it comprises at least proportionally film-forming components that are chemically curable, is referred to as being chemically curable. Acceleration of curing is possible by a catalyst, such as a curing catalyst. Curing can also or in addition to the addition of a catalyst be further accelerated by energetic activation of this chemical reaction by means of thermal energy or actinic radiation, with the term "actinic-chemical curing" referring to the curing of the composition by use of electromagnetic radiation, for example electron beam, NIR or UV radiation. A film is thus a continuous layer of an applied coating composition or coating material, the formation of the film being the transition of an applied coating composition or coating material from the liquid to the solid state by drying and/or hardening. Both changes can proceed simultaneously. Thus, the process of at least partial drying (flash-off) of the optionally applied basecoat in step (1) and at least partial drying (flash-off) of the inventive coating composition in step (2) may overlap or go hand-in-hand with (chemical) curing in step (3). Especially if no additional energetic activation such as thermal energy is provided in step (3), which is preferred, no sharp transition from the process of partial drying (dust-free time) to curing may be observed. Both processes occur at the same time.

With preference, curing or joint curing in step (3) is performed at a temperature of about 5 to 120° C., preferably at about 5 to 45° C. or about 15 to 25° C., at a relative humidity from about 10 to 100%, preferably about 40 to 70%, for a duration of 30 to 90 minutes, preferably 50 to 80 minutes.

It is to be understood that the total time from application of a coating according optional step (1) and step (2) to having a ready-to-use or cured coating by the end of step (3) may be or is in the range of the sum of the flash-off times disclosed for optional step (1) and step (2) and the curing time of step (3).

Substrate (S) preferably utilized in the process according the invention can be selected from metallic substrate, plastic substrates, and substrates containing plastic and metallic parts. Suitable metallic substrates are selected from aluminum substrates, copper substrates, zinc substrates, magnesium substrates and substrates consisting of alloys of these metals thereof as well as steel components. The term "plastic substrates" relates to substrates consisting of a polymeric material. Suitable polymeric materials for plastic substrates are selected from (i) polar plastics, such as polycarbonate, polyamide, polystyrene, styrene copolymers, polyesters, polyphenylene oxides and blends of these plastics, (ii) synthetic resins such as polyurethane RIM, SMC, BMC, ABS and (iii) polyolefin substrates of the polyethylene and polypropylene type with a high rubber content, such as PP-EPDM, and surface-activated polyolefin substrates. It is also possible to coat substrates consisting of a variety of the abovementioned materials, or to coat already coated substrates such as vehicles, aircraft or boats and also parts thereof, especially vehicle bodies or parts for exterior mounting. Hence, substrate (S) may be an optionally pretreated metallic or plastic substrate coated with a basecoat or with a multilayer coating preferably having defects.

The substrate (S) may if desired be coated directly—without a sanding operation, and optionally after simple cleaning—with the coating compositions according optional step (1) and step (2), to form one or more basecoat layers and/or one or more clearcoat layers. Preferably no primer-surfacer coat is applied to the substrate coated in accordance with the invention; instead, a basecoat composition and/or a topcoat coating composition, more particularly a clearcoat composition, is applied directly to the substrate (S). Basecoat materials which can be used are in principle all basecoat materials that are conventionally used in OEM finishing or in refinishing, including water-borne and solvent-borne basecoats. Such basecoat materials are available, for example, from BASF Coatings GmbH.

Application of a coating composition according the inventive process takes place with the methods known and customary in coatings technology for applying liquid coating materials, such as for example spraying, knife coating, curtain coating, vacuum coating, rolling, pouring, dipping, spin coating, squeegeeing, brushing or squirting or by means of printing techniques such as screen, gravure, flexographic or offset printing and also by means of transfer methods. Preference is given to employing spray application methods, such as, for example, compressed air spraying (pneumatic application), airless spraying, high-speed rotation, electrostatic spray application (ESTA), optionally in conjunction with hot spray application such as hot air (hot spraying), for example. With very particular preference the inventive coating composition is applied via pneumatic spray application or electrostatic spray application. The inventive coating composition is applied such that the coating layer preferably has a dry film thickness of 5 to 100 µm, preferably 30 to 60 µm.

What has been said about the inventive kit-of-parts and the inventive coating composition applies mutatis mutandis with respect to further preferred embodiments of the inventive coating process.

Inventive Coated Substrate

The result of the inventive coating process is a substrate (S) coated with a coating or a multilayer effect and/or color coating obtained from the coating composition prepared from the inventive kit-of-parts or of the inventive coating composition.

The coating composition prepared from the inventive kit-of-parts or of the inventive coating composition, or of the inventive process to prepare a coating layer or multicoat layer on a substrate, or of the coated substrate resulting from the inventive method may be used in numerous areas. Examples include the use in automotive finishing, for the repair of finishes, for automotive refinishing and/or for the coating of parts for installation in or on automobiles, of plastic substrates, or of commercial vehicles, and/or for coating any type of item.

What has been said about the inventive kit-of-parts, the inventive coating composition and the inventive methods applies mutatis mutandis with respect to further preferred embodiments of the inventive coated component.

EXAMPLES

The present invention will now be described in greater detail using working examples. However, these working examples are intended to illustrate the invention and are not to be construed to limit the scope of the invention. Persons having ordinary skill in the art will appreciate that variations of the Examples are possible within the scope of the invention as defined solely by the claims. Hereinafter, the terms "parts", "%" and "ratio" in the examples denote "parts by mass", "% by weight" and "mass ratio" respectively unless otherwise indicated.

Methods of Determination

Solids Content (Solids, Nonvolatile Fraction)

The nonvolatile fraction is determined according to ASTM D2369 (date: 2015). In this procedure, 2 g of sample are weighed out into an aluminum dish which has been dried beforehand, and the sample is dried in a drying cabinet at 110° C. for 60 minutes, cooled in a desiccator, and then reweighed. The residue, relative to the total amount of sample introduced, corresponds to the non-volatile fraction.

Determination of Number-Average and Weight-Average Molecular Weight

The number-average molecular weight ($M_n$) is determined by gel permeation chromatography (GPC) according to DIN 55672-1 (March 2016). Besides the number-average molecular weight, this method can also be used to determine the weight-average molecular weight ($M_w$) and also the polydispersity d (the ratio of weight-average molecular weight ($M_w$) to number-average molecular weight ($M_n$)). Tetrahydrofuran is used as the eluent. The determination is made against polystyrene standards. The column material consists of styrene-divinylbenzene copolymers.

Yellowness

As indicator for yellowness the APHA color of a sample is determined by a spectrophotometric method and expressed in Platinum/Cobalt units (Pt/Co units) according DIN EN ISO 6271:2015. Values above 100 are considered as not acceptable.

Anti-Scratch Performance after Polishing

As indicator for scratch resistance after polishing a sample of the coating material to-be-tested is applied wet-in-wet in a method according the invention. In a first step, a commercially available black aqueous basecoat was applied in a dry layer film thickness of 16 μm±2 μm using a gravity-feed cup gun to Bonder metal panels (coated with a commercial cathodic electrocoat and with a commercial conventional solventborne primer-surfacer), with the basecoat layer allowed to dry for 15 min at a temperature of 21° C.±2° C. at a relative humidity of 50%±10% (dust free time). In a second step, the coating material to-be-tested was applied in a dry layer film thickness of—40 μm±5 μm using a gravity-feed cup gun to the previously applied basecoat layer of the first step. Drying of the coating material to-be-tested and curing of the multicoat layer formed from the basecoat layer and coating material to-be-tested was completed after 90 min at a temperature of 21° C.±2° C. at a relative humidity of 50%±10%.

After 2 hours of storage at ambient temperature, a sanding site is applied to the cured clearcoat panel (using excentric compressed-air vibrating sander from 3M, 10 000 rpm, sanding disk: 3M Finesse-it Trizact 50079). This sanding site is subsequently polished up with polishing paste in a coarse polishing step (rotary polishing operation 800-1000 rpm, paste: 3M 50417 fast cut plus sanding paste, polishing pad: 3M 50487 green polishing foam) and finer polishing step (rotary polishing operation 1200-1500 rpm, paste: 3M 80349 Perfect-it extra fine plus polishing paste, polishing pad: 3M 50488 yellow polishing foam). After removal of the polishing paste with a microfiber cloth, the appearance of scratches on and the gloss retention of the polished surface was inspected visually and categorized on a scale from 3 (unacceptable, scratches having a length larger or equal to 3.0 cm can be observed with the naked eye from a distance of 50 cm) to 1 (acceptable, no visual scratches or scratches having a length of less than 0.5 cm can be observed with the naked eye from a distance of 50 cm).

Pot Life

The pot life is defined as the time in which the kinematic viscosity of the sample to be tested exceeds a flow time of 24 s at 23° C. in a DIN 4 mm cup (DIN 53211). A pot life of at least 28 min is acceptable.

Materials

Desmophen® NH 1420, a polyaspartic acid ester prepared from bis-(4-aminocyclohexyl)-methane (amine number of 195-205), from Covestro AG, Germany.

Desmodur® N3600, an aliphatic isocyanate polymer based on hexamethylene diisocyanate trimer (HDI homopolymer) (NCO content 23.0, viscosity at 25° C., 1100 mPas*s, equivalent weight 183, 100% solids content), Covestro, Germany Desmodur® Z4470 MPA/X, an aliphatic polyisocyanate based on isophorone diisocyanate trimer (IPDI trimer) (NCO content 11.9, viscosity at 25° C. 1500 mPas*s, equivalent weight 360, 70% solids content in 1-methoxy-propylacetate-2/xylene 1:1) Covestro, Germany.

Tolonate® X FLO 100, an aliphatic isocyanate polymer based on hexamethylene diisocyanate (HDI) (NCO content 12.3±1.0%, viscosity at 25° C. 140±80 mPas*s, equivalent weight 341, 100% solids content), Vencorex, France Tinuvin® 384, a liquid UV absorber (UVA) having the chemical structure: 95% Benzenepropanoic acid, 3-(2H-benzotriazol-2-yl)-5-(1,1-dimethylethyl)-4-hydroxy-, C7-9-branched and linear alkyl esters, 5% 1-methoxy-2-propyl acetate, BASF SE, Germany.

Tinuvin® 292, a liquid hindered amine light stabilizer (HALS) having a chemical structure of a) Bis (1, 2, 2, 6, 6-pentamethyl-4-piperidyl) sebacate & b) Methyl 1, 2, 2, 6, 6-pentamethyl-4-piperidyl sebacate, BASF SE, Germany.

BYK 302, a polyether-modified polydimethylsiloxane, Byk Chemie GmbH, Germany.

NanoBYK 3650, a dispersion of surface-treated silica nanoparticles, Byk Chemie GmbH, Germany.

The solvent n-butylacetate is commercially available from BASF SE, Germany, Oxea GmbH, Germany, or Ineos.

The solvent 5-Methylhexan-2-one (MIAK) is commercially available from Eastman.

The solvent 2-Methylpropan-1-ol (Isobutanol) is commercially available from BASF SE, Germany, Oxea GmbH, Germany, Ineos, or Sasol.

The solvent 2-Butoxyethan-1-ol is commercially available from BASF SE, Germany, Ineos, Dow, USA, or Sasol.

The solvent 1-Methoxy-2-propanyl acetate (MPA) is commercially available from BASF SE, Germany, Shell, or Dow, USA.

The solvent 4—Methylpentan-2-one (MIBK) is commercially available from Arkema, Celanese, USA, Dow, USA, Eastman, Sasol, or Shell.

The solvent xylene is commercially available from Total, Arsol, or Raffenerie Heide.

1. Preparation of a Component Comprising Polyaspartic Acid Ester, UVA and/or HALS Additive A component of a coating composition has been formulated with polyaspartic acid ester Desmophen® NH 1420 in combination with a typical UVA and/or HALS additive as shown in Table 1.

TABLE 1

| Compound | | 1A | 1B | 1C | 1D |
|---|---|---|---|---|---|
| Desmophen ® NH1420 | Polyaspartic acid ester | 60 | 60 | 60 | 60 |
| Tinuvin ® 292 | Hindered amine light stabilizer | | 0.9 | | 0.9 |
| Tinuvin ® 384 | UV absorber, benzotriazole type | | | 1.2 | 1.2 |
| Byk 302 | Surface additive | 0.2 | 0.2 | 0.2 | 0.2 |

TABLE 1-continued

| Compound | 1A | 1B | 1C | 1D |
|---|---|---|---|---|
| APHA color | | | | |
| t = 0 | 20 | 40 | 30 | 50 |
| After 1 week at 50° C. | 30 | 70 | 50 | 60 |
| After 2 weeks at 50° C. | 40 | 90 | 70 | 80 |
| After 3 weeks at 50° C. | 40 | 100 | 90 | 100 |

The color stability of the component containing polyaspartic acid ester and UVA and/or HALS additive was monitored by determination of the APHA color by the method described above directly after mixing the components (t=0), and after 1, 2, and subsequently 3 weeks storage at 50° C.

The results in Table 1 clearly demonstrate that in comparison to a very slow increase of the APHA color for formula (1A), with formula (1A) not comprising any UVA or HALS additive or additional solvent, the addition of Tinuvin® 292 as exemplary HALS additive (formula 1B), addition of Tinuvin® 384 as exemplary UVA additive (formula 1C), or addition of a combination of the HALS and UVA additive as typical UVA/HALS package (formula 1D) results in a considerable increase of the APHA color over time, with an just acceptable yellowness of 100 already after three weeks storage at 50° C. for formulations comprising the HALS additive. Thus, addition of Tinuvin® 292 and/or Tinuvin® 384 as exemplary UVA/HALS additives to the same component comprising the polyaspartic acid ester results in yellowness during storage.

2. Preparation of a Component Comprising Polyaspartic Acid Ester, UVA and HALS Additive as Well as Selected Organic Solvents A component of a coating composition has been formulated with polyaspartic acid ester Desmophen® NH 1420 in combination with a typical UVA and HALS additive as well as selected solvents as shown in Table 2.

TABLE 2

| Compound | | 2E | 2F | 2G | 2H | 2I | 2J |
|---|---|---|---|---|---|---|---|
| Desmophen ® NH1420 | Polyaspartic acid ester | 60 | 60 | 60 | 60 | 60 | 60 |
| n-Butyl acetate (BASF) | solvent | 27.6 | | | | | |
| 5-Methylhexan-2-one (MIAK) (Eastman) | Solvent | 10 | | | | | |
| 2-Methylpropan-1-ol (Isobutanol) (BASF) | Solvent | | 37.6 | | | | |
| 2-Butoxyethan-1-ol (BG) (BASF) | Solvent | | | 37.6 | | | |
| 1-Methoxy-2-propanyl acetate (MPA) (BASF) | Solvent | | | | 37.6 | | |
| 4-Methylpentan-2-one (MIBK) (Arkema) | Solvent | | | | | 37.6 | |
| Xylene (Total) | Solvent | | | | | | 37.6 |
| Tinuvin ® 292 | Hindered amine light stabilizer | 0.9 | 0.9 | 0.9 | 0.9 | 0.9 | 0.9 |
| Tinuvin ® 384 | UV absorber, benzotriazole type | 1.3 | 1.2 | 1.2 | 1.2 | 1.2 | 1.2 |
| Byk 302 | | 0.2 | 0.2 | 0.2 | 0.2 | 0.2 | 0.2 |
| APHA color | | | | | | | |
| t = 0 | | 40 | 40 | 30 | 30 | 40 | 40 |
| After 1 week at 50° C. | | 70 | 100 | 150 | 60 | 50 | 50 |
| After 2 weeks at 50° C. | | 85 | 175 | 225 | 70 | 80 | 80 |
| After 3 weeks at 50° C. | | 125 | | | 80 | 80 | 80 |

The color stability of the component containing polyaspartic acid ester, UVA and HALS additive as well as specific solvents was monitored by determination of the APHA color by the method described above directly after mixing the components (t=0), and after 1, 2, and subsequently 3 weeks storage at 50° C.

The results in Table 2 demonstrate a strong increase of the APHA color of the component already within one week upon addition of hydroxyl group-containing organic solvents 2-Methylpropan-1-ol (formula 2F) and 2-Butoxyethan-1-ol (formula 2G) to the formulation, whereas addition of organic solvents not comprising free hydroxyl groups such as 1-Methoxy-2-propanyl acetate, 4-Methylpentan-2-one, and Xylene (formula's 2H-2J) show a slow but after three weeks storage at 50° C. still acceptable increase of the APHA color, as indicator of yellowing.

Thus, 2-Methylpropan-1-ol and 2-Butoxyethan-1-ol as examples of monoalcohols and alkoxymonoalcohols having hydroxyl functional groups in combination with the polyaspartic acid ester and UVA/HALS package result in strong yellowing during storage.

3. Preparation of a Multicomponent Coating Composition from Three Separately Prepared Components (A), (B), and (C)

Three separately prepared components (A), (B), and (C) of a multicomponent coating composition according the invention have been formulated, wherein component (C) comprises the entire amount of UVA additive, HALS additive, and 2-Butoxyethan-1-ol as exemplary alkoxymonoalcohol of the entire multicomponent coating composition. Furthermore, an inventive non-pigmented coating composition was prepared by intensive mixing and homogenization of the separately prepared components (A), (B), and (C) in a volume ratio v/v/v of 100 parts A+100 parts B+10 parts C, as shown in Table 3.

from dispersions of surface-treated silica nanoparticles (NanoByk 3650) was added to component (A) in a total amount of 0%, 2%, 4% and 10% by weight, respectively, in each case based on the total weight of component (A). Hence, the additive (AD2) selected from dispersions of surface-treated silica nanoparticles was added in a total amount of 0%, 0.9%, 1.9% and 4.5% by weight, respectively, in each case based on the total weight of the coating composition. Thereby, additional inventive coating compositions V2, V3, and V4 have been prepared as shown in Table 4.

TABLE 3

| Compound | Component A | Component B | Component C | Coating V1<br>A:B:C = 100:100:10 |
|---|---|---|---|---|
| Desmophen ® NH1420 | 65 | | | 65 |
| n-Butyl acetate | 34.8 | 20 | 67 | 61.5 |
| 2-Butoxyethan-1-ol (BG) | | | 10 | 1 |
| Tinuvin ® 292 | | | 10 | 1 |
| Tinuvin ® 384 | | | 13 | 1.3 |
| Byk 302 | 0.2 | | | 0.2 |
| Desmodur N3600 | | 8 | | 8 |
| Tolonate ™ X FLO 100 | | 7 | | 7 |
| Desmodur ® Z4470 MPA/X | | 65 | | 65 |
| APHA color | | | | |
| t = 0 | 20 | 30 | 80 | 40 |
| After 1 week at 50° C. | 30 | 30 | 80 | — |
| After 2 weeks at 50° C. | 40 | 30 | 80 | — |
| After 3 weeks at 50° C. | 45 | 40 | 100 | — |

The color stability of the three individual components A, B, and C was monitored by determination of the APHA color by the method described above directly after mixing the individual components (t=0), and after 1, 2, and subsequently 3 weeks storage at 50° C.

The results in Table 3 demonstrate that the APHA color of component A comprising a polyaspartic acid ester and n-butyl acetate as organic solvent, a solvent not comprising free hydroxyl groups or being a ketone, is very stable and low. Similar accounts for component B comprising a combination of three isocyanate group-containing compounds and n-butyl acetate. Only the third component C comprising the UVA and HALS additive as well as 2-Butoxyethan-1-ol as exemplary alkoxymonoalcohol showed a minor and uncritical increase in the APHA color by 20 points after three weeks storage at 50° C.

By intensive mixing of the three separate components (A), (B), and (C) a multicomponent non-pigmented coating composition V1 was prepared. Direct (t=0) determination of the APHA color showed a low value of 40, being identical to the initial values of the APHA color determined directly after mixing of the ingredients for formulations 2E-2J. With a pot life of about 37 min at room temperature (23° C.) after mixing of the components no further measurements of the APHA color could be performed.

4. Preparation of a Multicomponent Coating Composition Comprising Three Separately Prepared Components (A), (B), and (C) Comprising an Additive (AD2) Selected from Dispersions of Surface-Treated Silica Nanoparticles In another set of experiments, a multicomponent coating composition was prepared as described above in section 3, Table 3, for coating V1, whereby in addition to the above given formulation for coating V1 an additive (AD2) selected

TABLE 4

| Coating | V1 | V2 | V3 | V4 |
|---|---|---|---|---|
| Desmophen ® NH1420 | 65 | 65 | 65 | 65 |
| n-Butyl acetate | 61.5 | 61.5 | 61.5 | 61.5 |
| 2-Butoxyethan-1-ol (BG) | 1 | 1 | 1 | 1 |
| Tinuvin ® 292 | 1 | 1 | 1 | 1 |
| Tinuvin ® 384 | 1.3 | 1.3 | 1.3 | 1.3 |
| Byk 302 | 0.2 | 0.2 | 0.2 | 0.2 |
| Desmodur N3600 | 8 | 8 | 8 | 8 |
| Tolonate ™ X FLO 100 | 7 | 7 | 7 | 7 |
| Desmodur ® Z4470 MPA/X | 65 | 65 | 65 | 65 |
| +NanoByk 3650 [% by weight based on component (A)] | 0 | 2 | 4 | 10 |
| Potlife [min] | 37 | — | 29 | 15 |
| Anti-scratch performance after polishing | 3 | 2 | 1 | — |

The potlife of the coating compositions V1 to V4 was determined by the method described above directly after mixing the individual components. The results in Table 4 demonstrate that the potlife decreases from 37 min (Coating V1, 0%) over still acceptable 29 min (Coating V3, 4%) to unacceptable 15 min (Coating V4, 10%) with increasing amount of surface treated nanoparticle dispersion (NanoBYK 3650) added.

The anti-scratch performance after polishing of coating V1 to V4 applied according the invention was determined by the method described above. The results in Table 4 show, that the anti-scratch performance after polishing improves with increasing amount of surface treated nanoparticle dispersion (NanoBYK 3650) added to the coating formulation.

Furthermore, the gloss retention after 6 weeks reflow of coating V3 was determined in close accordance with DIN 55654:2015-08 at an angle of 20°, with a scratch applied by a linear abrasion tester (crockmeter) using 2 μm and 9 μm abrasive paper from 3M. Good gloss retention values of 68% and 67% were obtained.

The optimal balance between the demand to an acceptable potlife and a high anti-scratch performance after polishing seems to have been reached for inventive coating composition V3, comprising 4% by weight of surface treated nanoparticle dispersion (NanoBYK 3650).

What is claimed is:

1. A kit-of-parts for preparation of a curable coating composition, comprising three separate containers C1, C2, and C3, wherein
   a) the container C1 contains an isocyanate-reactive component (A) comprising a polyaspartic acid ester compound;
   b) the container C2 contains a polyisocyanate (B);
   c) the container C3 contains a solvent (S1);
      wherein container C2 and/or container C3 optionally contains a solvent (S2); and
      wherein container C1 and/or container C3 optionally contains an additive (AD);
      characterized in that solvent (S1) is selected from the group consisting of monoalcohols and alkoxymonoalcohols;
      solvent (S2) is a ketone; and
      additive (AD) is selected from the group consisting of UV absorbers and hindered amine light stabilizers.

2. The kit-of-parts according to claim 1, wherein container C1 comprises a total amount of less than 10 weight % of solvent (S1), solvent (S2), and/or additives (AD), based in each case on the total weight of container C1.

3. The kit-of-parts according to claim 1, wherein the monoalcohols are selected from the group consisting of methanol, ethanol, n- and iso-propanol, butanol, 1-butanol (n-butanol), 2-butanol (sec-butanol), 2-methylpropan-1-ol (iso-butanol), and 2-methylpropanol (tert-butanol).

4. The kit-of-parts according to claim 1, wherein the alkoxymonoalcohols are selected from the group consisting of glycol ethers.

5. The kit-of-parts according to claim 1, wherein solvent (S2) is an asymmetrical ketone represented by the general formula $R^aC(=O)R^b$, wherein $R^a$ and $R^b$ are not identical alkyl groups directly bound to a carbonyl group $C=O$, wherein $R^a$ is any series of univalent radicals of the general formula $C_pH_{2p+1}$ derived from unsubstituted aliphatic hydrocarbons, having a straight arrangement of constituent carbon atoms containing 1 to 4 carbon atoms, and wherein $R^b$ is any series of univalent radicals of the general formula $C_pH_{2p+1}$ derived from unsubstituted aliphatic hydrocarbons, having a straight or branched arrangement of constituent carbon atoms containing 1 to 6 carbon atoms.

6. The kit-of-parts according to claim 1, wherein solvent (S2) is 5-methylhexan-2-one.

7. The kit-of-parts according to claim 1, wherein the total amount of additives (AD) selected from the group consisting of UV absorbers and hindered amine light stabilizers, based on the total weight of the additives (AD) in the kit-of-parts, is contained in container C3.

8. The kit-of-parts according to claim 1, wherein the polyaspartic acid ester compound has an equivalent weight of about 200 to 500.

9. The kit-of-parts according claim 1, wherein any one of containers C1, C2, and/or C3 further comprises an Additive (AD2) selected from the group consisting of dispersions of surface-treated silica nanoparticles.

10. The kit-of-parts according claim 1, wherein the at least one polyisocyanate (B) comprises at least one aliphatic isocyanate functional material and at least one cycloaliphatic isocyanate functional material, wherein the cycloaliphatic isocyanate functional material is present in a total amount of more than about 50 weight % based on the total weight of the aliphatic and cycloaliphatic isocyanate functional materials contained in polyisocyanate (B).

11. A coating composition prepared from the kit-of-parts according to claim 1 by mixing at least containers C1, C2, and C3.

12. The coating composition according to claim 11, wherein container C1 comprising the isocyanate-reactive component (A) comprising at least one polyaspartic acid ester compound and container C2 comprising the polyisocyanate (B) are mixed at an NH:NCO ratio of from 0.5:10 to 10:0.5.

13. A process for preparing at least one coating on a substrate(S), said process comprising the following steps:
   (1) optionally applying at least one basecoat composition to at least a part of the substrate to form at least one basecoat layer;
   (2) applying a coating composition prepared from the kit-of-parts according to claim 1 to at least a part of the substrate or directly to the at least one basecoat layer formed in step (1) to form a coating layer;
   (3) curing the clearcoat layer formed in step (2), or jointly curing the at least one basecoat layer formed in step (1), if present, and the clearcoat layer formed in step (2).

14. The process according to claim 13, wherein the substrate(S) is an optionally pretreated metallic or plastic substrate coated with a basecoat or with a multilayer coating.

15. A coated substrate(S) obtained by a method as claimed in claim 13.

16. The kit-of-parts according to claim 1, wherein container C1 comprises a total amount of less than 5 weight % solvent (S1), solvent (S2), and/or additives (AD), based in each case on the total weight of container C1.

17. The kit-of-parts according to claim 1, wherein container C1 comprises a total amount of less than 1 weight % of solvent (S1), solvent (S2), and/or additives (AD), based in each case on the total weight of container C1.

18. The kit-of-parts according to claim 1, wherein container C1 comprises no or 0 weight % of solvent (S1), solvent (S2), and/or additives (AD), based in each case on the total weight of container C1.

19. The kit-of-parts according to claim 1, wherein the monoalcohols are selected from the group consisting of n- and iso-propanol, and n-, sec-, and iso-butanol.

20. The kit-of-parts according to claim 1, wherein the monoalcohols are iso-butanol.

* * * * *